US010330466B2

(12) United States Patent
Kipfer et al.

(10) Patent No.: US 10,330,466 B2
(45) Date of Patent: Jun. 25, 2019

(54) COMPENSATION OF LIGHT INTENSITY ACROSS A LINE OF LIGHT PROVIDING IMPROVED MEASURING QUALITY

(71) Applicant: HEXAGON TECHNOLOGY CENTER GMBH, Heerbrugg (CH)

(72) Inventors: Peter Kipfer, Marbach (CH); Johan Stigwall, St. Gallen (CH); Thomas Jensen, Rorschach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 15/343,173

(22) Filed: Nov. 3, 2016

(65) Prior Publication Data
US 2017/0122728 A1    May 4, 2017

(30) Foreign Application Priority Data

Nov. 4, 2015  (EP) ..................................... 15192950

(51) Int. Cl.
*G01B 11/25* (2006.01)
*G02B 27/09* (2006.01)
*G02B 19/00* (2006.01)
*G02B 3/00* (2006.01)

(52) U.S. Cl.
CPC ...... *G01B 11/2518* (2013.01); *G02B 27/0927* (2013.01); *G02B 27/0961* (2013.01); *G02B 27/0966* (2013.01); *G02B 3/005* (2013.01); *G02B 19/0009* (2013.01); *G02B 19/0052* (2013.01)

(58) Field of Classification Search
CPC ............ G01B 11/2518; G01B 11/2545; G02B 19/0009; G02B 19/0052; G06T 7/521

USPC .................................. 356/604–614, 623–624
See application file for complete search history.

(56) References Cited

U.S. PATENT DOCUMENTS

| 5,615,003 A * | 3/1997 | Hermary .............. G01B 11/245 |
| | | 250/559.23 |
| 6,212,012 B1 | 4/2001 | Tanaka |
| 2001/0043335 A1 | 11/2001 | Norita et al. |

(Continued)

FOREIGN PATENT DOCUMENTS

| CN | 2696008 Y | 4/2005 |
| DE | 102004026090 A1 | 12/2005 |

(Continued)

OTHER PUBLICATIONS

Extended European Search Report dated May 25, 2016 as received in Application No. 15192950.2.

(Continued)

*Primary Examiner* — Isiaka O Akanbi
(74) *Attorney, Agent, or Firm* — Maschoff Brennan

(57) ABSTRACT

Method of providing measuring light for triangulation-based distance measurement to an object to be measured, wherein distance information is derivable by detecting at least portions of the measuring light reflected at the object. The method comprises emitting light and shaping the light so that the measuring light is provided in form of a line having a midpoint and two opposite ends. The intensity distribution of the light across the line is adjusted so that a respective light intensity at the ends of the line is at least 10% higher than light intensity around the midpoint.

16 Claims, 5 Drawing Sheets

(56) References Cited

U.S. PATENT DOCUMENTS

| | | | |
|---|---|---|---|
| 2003/0128543 A1* | 7/2003 | Rekow | G02B 27/09 362/259 |
| 2005/0063428 A1* | 3/2005 | Anikitchev | G02B 27/0955 372/9 |
| 2006/0182155 A1* | 8/2006 | Windpassinger | G02B 27/0905 372/9 |
| 2008/0117531 A1 | 5/2008 | Asper et al. | |
| 2010/0008588 A1* | 1/2010 | Feldkhun | G01B 11/2518 382/206 |
| 2010/0220370 A1 | 9/2010 | Ueno et al. | |
| 2013/0222865 A1 | 8/2013 | Iwamatsu et al. | |
| 2014/0027417 A1* | 1/2014 | Simon | B23K 26/0081 219/121.65 |

FOREIGN PATENT DOCUMENTS

| | | |
|---|---|---|
| DE | 102008033358 A1 | 2/2009 |
| EP | 1860864 A1 | 11/2007 |
| GB | 982520 A | 2/1965 |
| GB | 2257280 A | 1/1993 |
| WO | 2007125081 A1 | 11/2007 |
| WO | 2011000435 A1 | 1/2011 |
| WO | 2014109810 A1 | 7/2014 |

OTHER PUBLICATIONS

Meinschien, J., et al., "Improvements of high power diode laser line generators open up new application fields", Proceedings SPIE 7198, High-Power Diode Laser Technology and Applications VII, vol. 7198, pp. 71980N-1-71980N-8 (Feb. 23, 2009).

* cited by examiner

COMPENSATION OF LIGHT INTENSITY ACROSS A LINE OF LIGHT PROVIDING IMPROVED MEASURING QUALITY

FIELD

The present invention generally pertains to a method and device for triangulation measurement of a surface of an object using an improved approach of light emitting for compensation of decrease of light intensity along the line to be received by a camera.

BACKGROUND

It is common practice to inspect work pieces subsequent to production on a coordinate positioning apparatus, such as a coordinate measuring machine (CMM), in order to check for correctness of predefined object parameters, like dimensions and shape of the object. Moreover, a detection of a surface of an unknown object is of interest in many industrial applications. Such measurement typically also may be provided using a coordinate measuring machine or any other suitable type of scanning device.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probing unit) carried by the probe head. Such probing unit can be designed as a tactile probe or an optical sensor providing measurements of surfaces e.g. based on the principle of triangulation.

In a simple form of the machine a suitable transducer mounted parallel to each axis is able to determine the position of the probe head relative to a base of the machine and, therefore, to determine the coordinates of measurement points on the object being illuminated by the sensor. For providing movability of the probe head a typical coordinate measuring machine may comprise a frame structure on which the probe head is arranged and driving means for moving frame components of the frame structure relative to each other.

An advantage of using an optical sensor is that it is not in contact with the part and therefore does not deform it during the measurement or damage it, as may be the case with a tactile probe.

An advantage of using a line triangulation device in combination with a CMM for measuring a surface is the amount of distance information being received by one time step, i.e. distance values along the entire projected triangulation line can be determined and respective coordinates can be derived. Thus, by moving the sensor along a desired measuring path an object to be measured can entirely be scanned significantly faster.

Over the past 20 years, manually operated portable CMM systems, comprising typically four segments linked together with one or two rotation axes per linkage and a total of six or seven axes, have become popular for non repetitive measurement tasks on the shop floor. Line triangulation device are also used on such portable CMMs to greatly increase data capture speed.

Other portable measurement devices where triangulation units are used include optically tracked systems, either using multiple cameras to track the probe location and orientation or interferometric distance tracking devices, where the rotational axes of the probe are tracked using an additional camera.

Other applications for line triangulation sensors include fixed installations where an object is placed in front of the sensor or sensors and single line measurement(s) of the static object are made such that key features of the part can be captured in a single step without the need for expensive positioning systems.

Furthermore, a device for providing a topographic measurement of a surface can be embodied as a (hand-held) device comprising a triangulation sensor, wherein the device is guided along the surface to be measured—either manually or by a robot—and distance data are acquired by the sensor while moving the device. Additionally, the position and/or orientation of such device may continuously be determined (e.g. tracked) in a global coordinate system thus enabling a determination of absolute coordinates corresponding to the object's surface.

In general, triangulation provides a method for scanning a surface in fast and precise manner. Measuring devices working on that principle are for instance known from DE 10 2004 026 090 A1 or WO 2011/000435 A1.

In particular, a line generated by a laser unit, e.g. by moving a laser point along such line or by providing a laser fan, is generated on an object to be measured and the light reflected from the surface is detected by a camera consisting of a light sensitive image sensor (light detector) and electronics to control the image sensor and read out the image. An image of the reflected light is captured and distance information according to the contour of the detected line is derived. Based thereon, topography of the object's surface can be determined.

For triangulation measurements with high precision, an illumination and detection of respectively reflected light has to be provided which comprises a proper level of illumination and an adequate detection of the light information. For adjusting illumination so that the reflected light reaches the detector meeting its respective detection properties (e.g. signal-to-noise level and saturation limit) WO 2011/000435 A1 discloses an approach of an in-advanced illumination in order to determine a suitable illumination level for the measuring light. WO 2007/125081 A1 discloses a further approach for actively controlling the power of illuminating light in dependency upon an intensity detected by a camera.

However, even in case of adjusting the level of illumination there remains the disadvantage of decreasing light intensities typically at the ends of the projected and detected laser line due to optical properties of the receiver lens system. Such effect is known as $\cos^4$-law for falloff of the illumination across a camera image. Some lenses also exhibit even stronger falloff known as vignetting.

WO 2014/109810 A1 teaches a method of manipulating light emitted by a laser source in order to provide a laser line being emitted with a uniform intensity across the line, i.e. by flatting a Gaussian profile of the laser. However, as the optics of the receiving part of the system still introduces intensity dissipation and/or non-homogeneous intensity distributions there still remains the problem of receiving a reflected and non-homogeneous laser line which negatively influences readout quality over an entire detection area.

SUMMARY

Some embodiments of the present invention provide an improved method and triangulation measuring device for enabling an illumination of an object to be measured and a detection of reflected light so that reliable, in particular homogeneous, light information can be detected for the entire illuminated region.

Some embodiments of the present invention provide a corresponding measuring device providing improved measuring properties.

Laser triangulation sensors typically use a light or laser line to measure the 3D location of points along the illuminated line by observing the shift of the line using a camera positioned at a certain baseline distance and orientation from the light/laser plane.

Some embodiments of the present invention relates to the general idea of providing a method and device for distance measurement based on triangulation, wherein the light of the light or laser line which impinges on a detector of the camera after reflection arrives at the detector with uniform light intensity across its linear extension.

A laser line emitted by a laser emitter and received on side of a camera according to prior art typically comprises an intensity distribution across the line which is inhomogeneous. In particular, brightness of received light is high in the centre of a captured image and decreases towards its boundaries.

Non-uniformity of light intensity reaching the sensor of a triangulation device is among others mainly based on the so called $\cos^4$-law for falloff of illuminance across a camera image. That law describes an illumination falloff when projecting a homogeneously illuminated object by means of a lens, wherein the illumination falloff with reference to a light intensity in the middle (defined by the optical axis of the lens) of the projection increases according to a factor $\cos^4 \alpha$ with rising (angular) distance to that midpoint ($\alpha$ represents an angle corresponding to a distance between the optical axis of the lens and a respective point of the object to be projected).

Lens-objectives with a large field of view (FOV) show a drop of intensity in the image. If the object is homogeneously illuminated, the outer pixels of the camera chip are less bright and a loss in dynamic results.

A main cause in the reduction of the photometric illuminance is the reduction of the captured solid angle by the aperture stop of the lens-objective.

A first contribution to the $\cos^4$-law comes from a reduction of the photometric intensity of light. That is based on the effect that a surface element of the object having a defined distance from the centre of the object (intersection of the optical axis and the object plane) appears shortened by a factor $\cos(\alpha)$ because the element is tilted relative to the respective viewing angle by the angle $\alpha$. This is why correspondingly less light is emitted in direction of the lens (and consequently the sensor; Lambertian law). The intensity of light for such surface element is thus defined by $I'=I\cdot\cos(\alpha)$ (wherein I represents the intensity of light in a direction perpendicular to the surface of the object plane).

A further contribution to the $\cos^4$-law comes from the effect that an aperture stop (lens) seen from the surface element then no longer appears as a circle but appears as an ellipse the minor axis of which is shortened by a factor $\cos(\alpha)$. That leads to a virtual length $d'=d\cdot\cos(\alpha)$ for the minor axis, wherein d is the diameter of the circular lens.

Furthermore, the distance between the lens and the surface element increases with the surface element's distance to the middles of the object, i.e. the distance to the lens grows with the field angle $\alpha$. The distance between the non-centred surface element and the aperture stop is $$g' = \frac{g}{\cos(\alpha)},$$

wherein g is the distance from lens to object along the optical axis.

The solid angle $\omega$ (in case the surface element is on the optical axis) is given by the diameter of the lens d and the distance g to the object $$\omega = \frac{d^2}{4 \cdot g^2} \cdot 1 sr.$$

Consequently, the solid angle for a surface element not located on the optical axis is defined by $$\omega' = \frac{\cos^3(\alpha) \cdot d^2}{4 \cdot g} \cdot 1sr$$
$$= \omega \cdot \cos^3(\alpha).$$

Generally, the luminous flux $\Phi$ through the lens (aperture stop) depends on the solid angle $\omega$ and the intensity of respective light I and is $\Phi=\omega\cdot I$.

Again now considering a surface element dislocated from the centre the luminous flux is given by $\Phi'=\omega'\cdot I'=\Phi\cdot\cos^4(\alpha)$.

As illuminance E here is defined by $$E = \frac{\Phi'}{dA'}$$

and dA' corresponds to the area in the image plane defined by the projection of the surface element, illuminance on the image plane is proportional to the factor $\cos^4(\alpha)$.

Further description of the $\cos^4$-law can be found e.g. in "Digitate Luftbildkamera", R. Sandau, Wichmann Verlag (2005).

The above described falloff of illuminance is valid not only for optical elements like a lens but for luminous flux $\Phi$ through (circular) aperture in general.

Consequently, for reception and detection of a laser line for triangulation matters the $\cos^4$-law applies as well and leads to respective intensity loss towards the ends of the laser line.

The effect of falloff according to the $\cos^4$-law is not limited to laser lines only but applies for light lines as well, e.g. light lines generated by use of a LED in combination with a specific filter.

Some embodiments of the present invention relates to a method (and respective device) for providing measuring light in form of a light or laser line, wherein the intensity distribution across the generated line is adapted so that predictable losses, in particular due to the $\cos^4$-law, are considered. I.e. the intensity of the emitted light is adjusted excessive in regions where respective losses are expected and vice versa.

According to another—alternative or additional—approach according to some embodiments of the invention respective filtering of arriving (laser) light is provided on side of the receiving unit (e.g. camera) in a way that light in regions of higher intensities is attenuated in order to achieve a homogeneous distribution of light intensity. Respective filtering is based on the knowledge about optical losses occurring within the triangulation system.

In other words, the invention relates to a method of providing measuring light, in particular laser light, for triangulation-based distance measurement to an object to be measured, wherein distance information is derivable by detecting at least portions of the measuring light reflected at the object. The method comprises emitting light and shaping the light so that measuring light is provided in form of a light or laser line having a midpoint and two opposite ends.

According to some embodiments of the invention the intensity distribution of the light across the light or laser line is provided (adjusted) so that a respective light intensity at the ends of the line is at least 10% greater than light intensity around the midpoint. In other words, the light intensities at the ends of the line (each on its own) can be of intensities (each one) which correspond to at least 110% of the intensity around the midpoint.

Such adjustment of the light takes into account losses given by optical elements (e.g. lens, aperture) especially on side of a light receiving unit (e.g. camera with respective sensor) and/or due to effects occurring with projection of light, wherein those losses mainly depend on the design of the triangulation system and preferably are well known.

By doing so, the dynamics of a whole measuring process can be improved due to reducing or avoiding respective losses and thus providing uniform detection conditions over the whole line. Consequently, exposure times of the detecting sensor can be adjusted to one common level for all pixels which improves dynamic of the sensor.

As significant decrease of (laser) light intensity at the ends of the generated laser line is given due to the $\cos^4$-law, the emitted light in particular is produced with an intensity distribution enabling a compensation of such intensity decay at the sensor unit. In particular, the intensity distribution of the light across the line is adjusted so that light intensity from the midpoint to the respective ends of the line increases according to a factor proportional to $$\frac{1}{\cos^4(\alpha)}.$$

Such particular intensity distribution can be realised by use of at least one cylindrical or acylindrical lens array at the light emitting unit (or one (a-)cylindrical lens alone). By "acylindrical" it is here meant a near-cylindrical shape optimized for a specific function, in analogy to how "aspheric" is use for circularly symmetric lenses. In the following, "cylindrical" and "acylindrical" are used exchangeably and both refer to both possibilities.

In case an intensity decay along the light line according to a factor smaller than $\cos^4(\alpha)$ is expected, the light line can be provided with a respectively adjusted intensity increase towards its ends.

For instance, if there is contribution of possible intensity losses of not each and every (cosine-) factor mentioned above or in case that contribution of one or more effects is less than a factor $\cos(\alpha)$, the intensity distribution of the light across the line may be adjusted so that light intensity from the midpoint to the respective ends of the line increases according to a factor proportional to $$\frac{1}{\cos^n(\alpha)},$$

wherein n is a positive integer smaller than or equal to 5, in particular wherein 2≤n≤5. Preferably, n=3 and an increase of intensity along the line is designed corresponding to $$\frac{1}{\cos^3(\alpha)}.$$

In particular, adjusted to respective optical properties of light defining elements, the intensity distribution of the light across the line is adjusted so that light intensity from the midpoint to the respective ends of the line increases according to an expected decay of intensity along the line due to an interaction with an optical element, in particular so that the expected decay is compensated and a signal amplitude on side of a detector provideable for receiving the line is basically constant along the received line. Thus, emitted light can specifically be adapted to structural properties of used optical equipment. For instance, as can be seen by simulation or experiment, a lens design may be better (flatter) than according to a $\cos^4$ behaviour and the generated light line is adjusted to such flatter decay.

Moreover, with line generation by use of a cylindrical lens array the intensity distribution would be defined over an angular spectrum. For illuminated object points in the field the projected area thus may be widened by a further cosine factor. The radiance I' of the object points is then reduced by the cosine of the illumination angle α.

Therefore, the intensity distribution of the (laser) light across the laser line may be adjusted so that light intensity as function of angle from the midpoint to the respective ends of the laser line increases according to a factor proportional to $$\frac{1}{\cos^5(\alpha)}.$$

By doing so, the light reducing influence caused by a cylindrical lens array is additionally considered and compensated already with generating and emitting the measuring laser light. As a result light (especially laser light) having a uniform intensity can be provided at a respective detecting unit.

According to some embodiments of the invention the intensity distribution of the generated light or laser light across the line may be defined by defined diffusion of the emitted light with a particular diffusion angle, wherein the midpoint of the line defines a diffusion angle of about 0° and maximum diffusion angle values correspond to the respective ends of the line.

Thus, the increase of the light intensity along the generated (laser) line can be provided as an increase of intensity with increasing diffusion (field) angle values according to a factor proportional to $$\frac{1}{\cos^n(\alpha)},$$

wherein n is a positive integer and n≤5, in particular wherein 2≤n≤5, in particular proportional to $$\frac{1}{\cos^3(\alpha)}, \frac{1}{\cos^4(\alpha)} \text{ or } \frac{1}{\cos^5(\alpha)}.$$

Above described approaches relate to generating and emitting proper measuring laser light in order to compensate for particular intensity irregularities. As mentioned, additionally or alternatively, the approach of filtering measuring (laser) light which reaches the sensor can be a separate solution or further contribution to such compensation.

Therefore, some embodiments of the invention also relates to a method of detecting measuring light, in particular laser light, provided for triangulation-based distance measurement to an object to be measured, wherein the measuring (laser) light is provided in form of a light (or laser) line with known intensity distribution across the line. In particular, the intensity distribution along the line is non-homogeneous (non-uniform). The detection method comprises receiving measuring light reflected at the object to be measured, directing the received measuring light to a sensor and detecting the received measuring light by means of the sensor.

According to that aspect of the invention the received measuring light is filtered so that non-uniformities of intensity distribution across the received line are compensated based on the known intensity distribution of the provided measuring light and in particular based on the optical effects caused by respective optical elements the measuring light is guided and/or shaped by. Additionally, due to the filtering, the measuring light reaches the sensor with a substantially uniform intensity distribution across the line.

For providing suitable filtering properties optical imaging properties of a respective triangulation device can be considered, i.e. the type of generated light and its intensity distribution, properties and arrangement of optical elements to form the measuring (laser) light, of optical elements on side of the receiving unit and e.g. a recommended field of view of the sensor. For instance, filtering may be provided by means of an anti-$\cos^n$-filter, wherein n is a positive integer≤5, in particular wherein 2≤n≤5, in particular by means of an anti-$\cos^3$-filter, anti-$\cos^4$-filter or anti-$\cos^5$-filter.

Furthermore, specific sensor properties can also be considered for adjustment of respective filtering. E.g. a pre-known angle-dependent sensitivity of the image sensor can be considered. Hence, the received measuring light can be recorded (detected) by the sensor with a substantially uniform signal amplitude distribution across the line. By doing so, the image sensor's angle dependence is also taken into account and a respective image recorded by the sensor shows uniform peak intensity along the captured line.

Of course, such sensor properties may also or alternatively be taken into account for adjusting the intensity of emitted light across the light line on the side of generation of the measuring light.

Further loss of luminance flux can arise by so called "vignetting" in the optics, especially for camera objectives with a large field of view. The cause of optical vignetting is that the exit pupil "sees" only a part of the entrance pupil for higher field angles. The result is a blurred shadowing of the exit pupil. The exact behaviour of the vignetting over the field angle can be determined by simulation or experimentally for a used camera objective.

Furthermore, most sensors have an acceptance angle for the incident light which typically is about 20°, for increasing angles the electrical signal decreases since the photons are hitting the metallised contacts or are stronger reflected by Fresnel reflection (sensor sensitivity over angle of incidence).

Consequently, the total decrease of intensity can be even stronger than $\cos^5(\alpha)$. Such further influences on intensity can be taken into account by deriving respective attenuation data (e.g. for vignetting and for sensor sensitivity over angle of incidence) and both or either adjusting the intensity of the emitted measuring light across the light line and/or the filtering across the light line according to such data.

Concerning the measurement of distances to an object by use of at least one of the approaches according to the invention of above the invention relates to a method for determining distances to the object to be measured based on the principle of triangulation. The method for determining the distances to the object comprises
  emitting (laser) light e.g. from a laser, LED or SLED,
  shaping the light so that measuring light is provided in form of a light or laser line,
  directing the measuring light to the object to be measured,
  receiving measuring light reflected at the object to be measured,
  guiding the received measuring light to a sensor,
  detecting the received measuring light by means of the sensor and
  deriving distance information based on the detected reflection.

Some embodiments of the method is defined by emitting the measuring light in form of the light line according to a method of the invention of above and/or by filtering the received measuring light according to a respective method of above. The emitting and/or filtering is adjusted so that the received measuring light reaches the sensor with a substantially uniform intensity distribution across the light line or so that the received measuring light recorded (detected) by the sensor has a substantially uniform signal amplitude across the line.

Some embodiments of the invention also relates to a light emitting unit, in particular of or for a triangulation-based distance measuring device, for providing defined measuring light. The light emitting unit comprises a light source, in particular laser source, for emitting light, in particular laser light, and a beam forming assembly for shaping the light by affecting propagation of the light emitted by the light source, wherein the beam forming assembly is arranged and designed so that measuring light is provided in form of a light line having a midpoint and two opposite ends.

The light source and the beam forming assembly are arranged and designed so that an intensity distribution of the light across the light line is adjustable such that a respective light intensity at the ends of the light line is at least 10% higher than light intensity around the midpoint.

Thus, falloff of the illuminance across a sensor unit which is arranged to receive reflected triangulation measuring light can be reduced or compensated totally by initially adjusting the emitted intensity distribution in proper manner.

According to some embodiments of the invention the beam forming assembly is arranged and designed so that the intensity distribution of the light across the light line is provided so that light intensity increases from the midpoint to the respective ends of the line according to a factor proportional to $$\frac{1}{\cos^n(\alpha)},$$

wherein n is a positive integer and n≤5, in particular wherein 2≤n≤5, in particular proportional to $$\frac{1}{\cos^3(\alpha)}, \frac{1}{\cos^4(\alpha)} \text{ or } \frac{1}{\cos^5(\alpha)}.$$

The choice of such proportionality factors is based on the existence of the cos$^4$-law and related to occurring intensity influencing effects. Of course, in case of any other alternative expected decay behaviour of the light intensity (depending e.g. on optical properties on side of the light source and/or the receiver), respective adjustment of the intensity increase can be provided.

Furthermore, the beam forming assembly can be arranged and designed so that the measuring light emitted by the light source is diffused by a particular diffusion angle, wherein the midpoint of the light line defines a field angle of substantially 0° and maximum diffusion angle absolute values correspond to the respective ends of the light line.

According to some embodiments of the invention the diffusion angle can be of a range of ±25° to ±30° (i.e. 25° or 30° in each direction of the laser line starting at the midpoint), in particular wherein an overall included angle of diffusion corresponds to 50° to 60°. The (laser) light emitted by the light source is spread according to an angle of above and thus may define an opening angle of e.g. 50°, 54°, 60° or any angle in between.

Using the diffusion (field) angle to define the intensity across the light line, the light intensity can increase with increasing field angle values according to a factor proportional to $$\frac{1}{\cos^n(\alpha)},$$

wherein n is a positive integer and n≤5, in particular proportional to $$\frac{1}{\cos^3(\alpha)}, \frac{1}{\cos^4(\alpha)} \text{ or } \frac{1}{\cos^5(\alpha)}.$$

The beam forming assembly can comprise a cylindrical lens and/or a first and/or a second micro-lens array, in particular respective cylindrical lens arrays, for providing particular diffusing of the light. The first micro-lens array then can be arranged to receive the measuring light emitted by the light source and the cylindrical lens can be arranged in-between the first and the second micro-lens array.

In particular, the beam forming assembly additionally comprises a collimator, a fast axis aperture stop and/or a baffle for further definition of the shape of the light line to be emitted.

A specific embodiment relates to the design of at least one of the micro-lens arrays, wherein at least one of the first and/or second micro-lens array can be designed having a micro-lens to micro-lens pitch in a range of 20 μm to 200 μm, in particular having a pitch in a range of 120 μm to 170 μm, in particular of 150 μm. I.e. the distance from the peak point of one micro-lens to the peak of a successive micro-lens preferably is about 150 μm.

Furthermore, at least one of the first and/or second micro-lens array can be designed having a topographic lens height regarding a surface of the respective micro-lens array (normal distance between the lowest point on the surface of the lens array and the peaks of the micro-lenses) of at least 5 μm, in particular between 5 μm and 50 μm or between 40 μm and 50 μm.

Moreover, the micro lenses of at least one micro-lens array, preferably the second one, comprise a radius of curvature between 55 μm and 56 μm. A respective array may comprise a conical constant of about −1.45 and/or a refractive index of about 1.5.

Furthermore, at least one of the first and/or second micro-lens array can comprise a periodic surface structure, in particular sinusoidal, in particular wherein the respective micro-lens array is represented by a pattern of convex and concave acylindrical lenses In other words and according to a specific embodiment, the design of at least one micro-lens array is sinusoidal meaning a periodic pattern of convex and concave acylindrical lenses with alternating radius sign between 7 and 18 μm.

A resulting output beam of the light emitting unit according to the invention in particular defines a light line, in particular a laser line, having a line length of 150 mm (e.g. flat top shape) in a distance to the light emitting unit of 150 mm. A corresponding line width would be about 150 μm (e.g. at least nearly Gaussian). The beam comprises a divergence in the region of ±27° in horizontal direction (slow axis of a collimated laser diode).

Preferably, laser light with a wavelength of 450 nm is produced by the light (laser) source.

Some embodiments of the invention also relates to a respective device for triangulation measurement. The triangulation-based distance measuring device comprises a light emitting unit with a light (e.g. laser or LED) source for providing measuring light (e.g. laser light) in form of a light line (e.g. laser line) with defined intensity distribution across the line, a light receiving unit having a sensor for detecting measuring light reflected and received from an object to be measured and a controlling and processing unit for deriving distance information based on the detected reflection. The light emitting unit and the light detection unit are arranged with known spatial position and orientation relative to each other, in particular according to the Scheimpflug criterion.

The light emitting unit and the light detection unit are—according to the invention—designed so and arranged relative to each other so that measuring light provideable by the light emitting unit and received by the light receiving unit reaches the sensor with a substantially uniform intensity distribution across the light line or is recorded (detected) by the sensor with a substantially uniform signal amplitude across the line.

Preferably, the light emitting unit of the triangulation-based distance measuring device is designed according to an embodiment of light emitting unit described above.

Alternatively or additionally, the light receiving unit can comprise a filter element adapted to filter the intensity distribution of receiving measuring light based on a known intensity distribution of the measuring light provideable by the light emitting unit so that the measuring light reaches the sensor with a substantially uniform intensity distribution across the light line or is recorded (detected) by the sensor with a substantially uniform signal amplitude across the light line.

In particular, the light receiving unit can comprise an anti-cos$^n$-filter, wherein n is a positive integer≤5, in particular wherein 2≤n≤5, in particular an anti-cos$^3$-filter, anti-cos$^4$-filter or anti-cos$^5$-filter.

It is to be understood in context of the present invention that above approaches can be either applied to a light line produced with an "ordinary" light source like a LED and can be applied to a laser line generated by any kind of laser source.

BRIEF DESCRIPTION OF THE FIGURES

The method and the device according to the invention are described or explained in more detail below, purely by way of example, with reference to working examples shown schematically in the drawings. Specifically, FIG. 1 shows a working principle of a triangulation device the present invention relates to;

DETAILED DESCRIPTION

Figure 1:
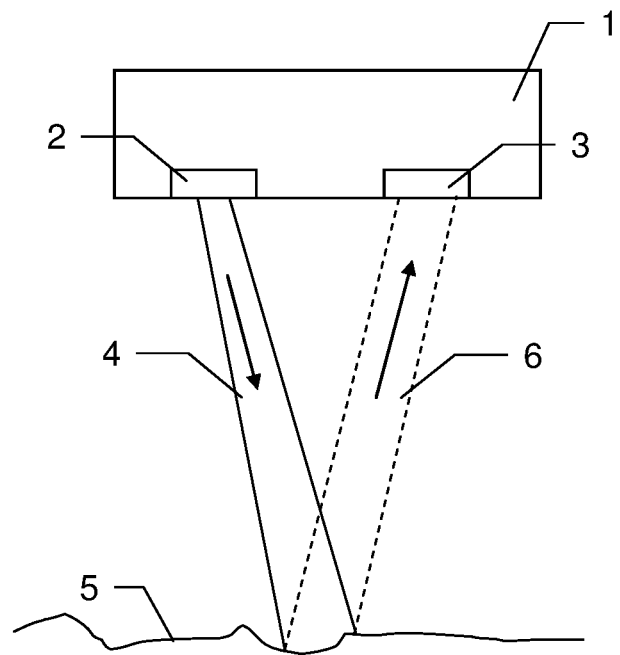

FIG. 1 shows the working principle of a triangulation device 1 according to the invention. The device 1 comprises a light emitting unit 2 and a light receiving unit 3, e.g. a camera, the relative positions and orientations of which are known.

In other words, triangulation is to send out light in one known direction from a known position and receive reflected light from a known position and measure the angle of the incoming light.

The light emitting unit 2 comprises a light source which may be represented by a laser diode for emitting laser light. Furthermore, the light emitting unit may comprise an optical unit for forming the emitted laser light so that a defined measuring beam 4 can be emitted. Preferably, such measuring beam is focussed according to a first direction (vertically) and diffused with respect to a second direction (horizontally), orthogonal to the first direction. By doing so, a laser line can be produced and projected onto an object 5 to be measured.

The light receiving or detecting unit 3 may comprise an optical assembly (e.g. imaging lens) as well to form and direct the reflected light 6 to an image sensor of that unit. The sensor preferably is designed as a CCD or CMOS sensor providing a pixel-array in form of a line or an area. The sensor is also preferably tilted according to the Scheimpflug criterion so that camera's object plane coincides with the illuminated plane so that all illuminated points are imaged sharply onto the sensor. The image sensor is designed being at least sensitive for light of a wavelength of the measuring light 5. The pixels of the image sensor are exposed by the incoming reflected light 6 and a course of the line at the object 5 can be derived based on the illuminated pixels of the sensor. That allows determining distances to the object's surface based on the knowledge of the relative positions of emitter 2 and detector 3 and the detected line, in particular based additionally on the properties of the optical assembly and the position of the detected line on the image sensor.

According to an alternative embodiment not shown here, the emitted beam 4 is emitted in a direction perpendicular to the housing, allowing to place an additional receiving unit at the left side of the emitting unit 2 in order to generate additional measuring data. There also can be arranged a third receiving unit 3 placed beside the emitting unit 2 at the same distance than the first one (and/or second one) or at different distances to achieve a higher robustness against the detection of objects with a strong contrast change (introducing a shift of the detected intensity centroid) or the detection of edges causing shadowing effects.

By moving the triangulation device 1 over the object 5, continuously receiving the reflected light 6 and processing signals provided by the image sensor, the surface of the object 5 can be measured in its entirety. In particular, such scanning is performed by a coordinate measuring machine (either motorized or hand-held) carrying the triangulation device 1 and moving it along a desired measuring path.

According to the invention the optical unit for forming the emitted laser light (beam forming assembly) is designed so that the emitted measuring light 4 comprises an intensity distribution across its laser line providing greater light intensities at the ends of the line and a lower intensity around the line's centre point, in particular light with at least 10% higher intensities at the ends. Such intensity profile is preferably achieved by proper spreading (diffusing) of the light emitted by the light source using e.g. micro-lens arrays and/or a cylindrical lens. As a result, after reflection and receiving of that adjusted measuring light and respective attenuations or the like, light with a substantially uniform intensity distribution arrives at the sensor unit.

In addition or alternatively, the light receiving unit 3 comprises an optical filter element which is adapted to properly filtering measuring light 4 of known properties which is reflected at the object 5 and received as reflected measuring light 6 so that intensity distribution of the received light is substantially known. Thus, the filter element provides the light which impinges on the sensor to have basically one uniform intensity distribution about the respective light line. Preferably, the filter element is arranged with the optical assembly directly in front of the sensor (behind an objective lens etc.).

According to another aspect of the invention, the light emitting unit 2 is controlled so that the measuring light 4 is emitted in pulsed manner and the receiver 3 provides a specific detection sequence for individually detecting reflections caused by each of the emitted pulses. Such detection may enable to derive a suitable measuring signal for both bright illuminated pixels and pixels which remain despite their illumination quite dark, i.e. for simultaneous illumination of parts of the object 5 providing high reflectivity and other parts having low reflectivity. More detailed description of that is given below with FIG. 3.

For checking if the object 5 to be measured is located within a defined measurement range (relating to a distance between the object and the measuring device) an optical visual guide can be projected within the measuring volume. That optical guide gives information (e.g. to an operator of the system) if the object 5 lies within a preferred measuring region (distance to the measuring device) or not. Such guide could be represented by a line of light being visually receivable and/or having e.g. particular light colour (wavelength) different from the wavelength of the measuring light. Depending on a relative position of that visual guide e.g. in a captured image the location of the object 5 with reference to the measuring range is provided. Such projection can be realised e.g. by illumination of a diffractive hologram as for instance known by the "Flexpoint DOE Series" of the company "Laser Components".

Figure 2:
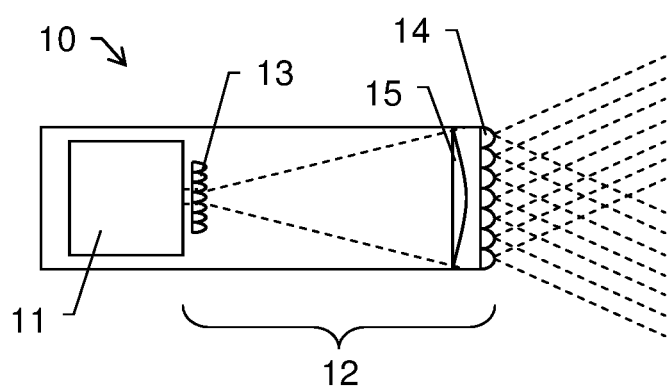
FIG. 2 shows an embodiment of a light emitting unit according to the invention.

FIG. 2 shows an embodiment of a light emitting unit 10 according to the invention. The unit 10 comprises a light source 11 and a beam forming assembly 12. The light source 11 here may be designed as a light emitting diode (LED), a laser diode or a broad area laser (BAL) (and a collimation lens) or any other kind of suitable light source.

Broad area lasers (BAL), also known as "broad stripe", "slab" or "broad emitter" laser diodes have a gain volume which is much wider in one lateral direction (here: second or horizontal direction). Compared to single-mode laser diodes which have gain regions which are small in both directions, a BAL emits a very high optical power (in the order of 1-10 W). A BAL can be used in pulsed mode with pulses typically below 100 ns.

In the wide direction, many spatial modes as well as longitudinal modes can coexist. In a narrow direction (here: first or vertical direction), preferably only one spatial ground mode propagates, and the laser can thus be focused down to a diffraction limited line focus. Furthermore, BALs are low cost and represent a suitable type of light source for this invention.

Alternatively, a light source may be used with very small extent as to the vertical direction or comprising an additional optical element which provides a corresponding small extent (e.g. a LED masked by a very thin slit)

The beam forming assembly 12 comprises a cylindrical lens 15 and two lenslet arrays 13,14 (micro-lens arrays). Using an arrangement of optical elements 13-15 as shown provides for diffusion (spreading) of the light emitted by the light source 11 so that a line of light is provided as measuring light for triangulation measurement of an object. The optical elements 13-15 provide a specific field (diffusing) angle of the measuring light, here of about ±27°, i.e. an overall opening angle of about 54°.

The cylindrical lens 15 preferably has a focal length essentially equal to the distance to lenslet array 13. Focussing in the vertical plane is basically provided by the design of the laser source 11.

It is beneficial to use cylindrical lens arrays e.g. instead of single-surface large lenses since the tolerance on lateral positioning is much less strict. Having two diffusers (e.g. the two lenslet arrays 13,14 as shown) also reduces speckle by in effect converting several transversal modes to spatial incoherence. The first diffuser (which spreads the light to cover the second one) could have a pitch at least around five times smaller than the beam width to reduce effects of lateral positioning.

Furthermore, the array of cylindrical lenses and the light source are preferably designed and arranged so that the measuring beam is emittable in form of a basically continuous line regarding its extension in the second direction. For that, the pitch of the first cylindrical lens array, the width of the laser diode and a laser collimation lens focal length can be chosen so that the projected diode width matches the diffraction angle of the lens array and the emitted line thus becomes continuous without any dark spots which could otherwise occur if the lens array pitch is too fine, the laser width too small or the collimator focal length too long. A too coarse array pitch, wide laser or short collimator focal length could on the other hand cause bright spots where two projections overlap, so it is optimal to choose these parameters exactly so that there is no overlap, or multiples of 100% overlap.

According to a specific embodiment, the configuration comprises one micro-lens array in combination with a 10 mm exit aperture.

In particular, prior to final diffusion, the laser beam is made "wide enough" to provide a large emitting surface. The initial width of the emitted (and collimated) beam may for instance be about 1 mm in the second direction, while after widening it may be 10 mm at the diffuser 14. Several types of components can be used to widen the emitted beam, e.g. a further cylindrical lens, a lenslet array, a diffractive optical element or some kind of computer generated or natural hologram. If the source is a laser without collimation in the horizontal direction (slow axis), the beam may diverge fast enough that no extra optics is needed. The first lenslet array 13 may represent such beam spreading element, wherein the second lenslet array 14 represents the beam diffusing element.

Concerning the used laser diode and a possible focussing collimator, these may comprise asymmetric aperture. The aperture particularly is designed to be as large as possible along the line (to enhance efficiency), i.e. in horizontal direction, and additionally narrower across the line to increase and define depth of focus, as well as to improve focus quality. With a smaller NA it is possible to use a cheaper lens. Moreover, it is difficult to achieve a large depth of focus with only one lens without aperture since it would have to have a very short focal length. A lens with longer focal length with aperture improves pointing stability since magnification from laser position to beam angle is smaller. Since the aperture costs some (e.g. 60%) efficiency, it is beneficial to have a high power laser diode like a BAL.

The light emitting unit 10 as shown provides a light line with a particular intensity distribution concerning the emitted light. Such distribution is provided by respective diffraction and collimation effects of the optical elements 13-15. The intensity is lowest in the middle of the produced line. The light intensity (brightness) increases towards the ends of the light line. The increase corresponds to a growth of intensity according to a factor $$\frac{1}{\cos^4(\alpha)},$$

wherein $\alpha$ represents a respective field or diffusion angle, i.e. the distance along the light line from the midpoint to a respective end. $\alpha$ is limited by the diffusion angle defined by the optical elements, e.g. finally by the cylindrical micro-lens array 14.

Figure 3A:
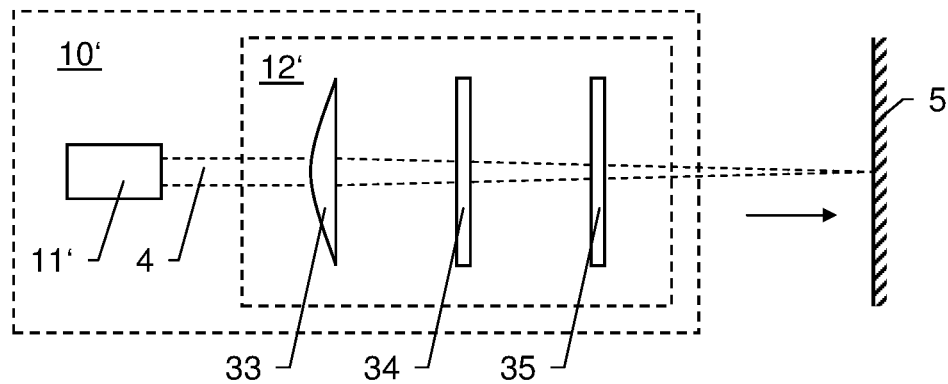
FIGS. 3a-b show a further embodiment of a light emitting unit according to the invention.
Figure 3B:
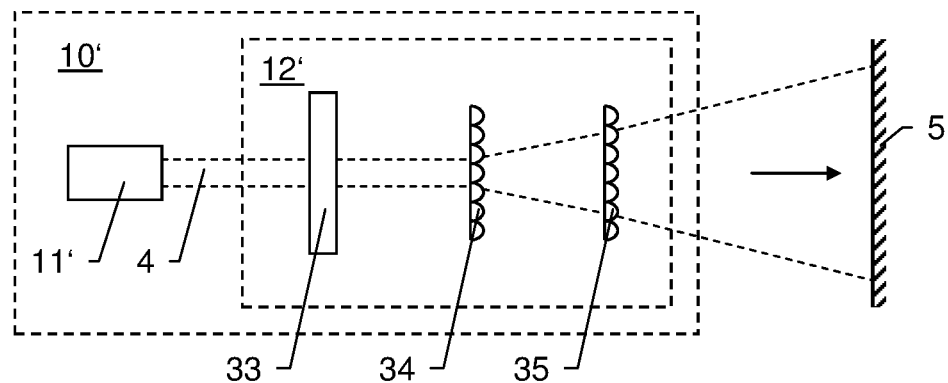

FIGS. 3a and 3b show a further embodiment for a light emitting unit 10' according to the invention in top view (FIG. 3b) and side view (FIG. 3a).

The light emitting unit 10' comprises a laser source 11' and a respective beam forming assembly 12'. The laser source 11' here is designed as a broad area laser (BAL) (and a collimation lens).

The beam forming assembly 12' comprises a cylindrical lens 33 which provides focussing the laser light 4 emitted by the laser source 11' in a first direction (the laser's fast axis, here called the vertical direction) perpendicular to the propagation direction of the laser light. The laser light 4 emitted comprises spatially coherence regarding this first direction.

The cylindrical lens 33 further allows to transmit the laser light 4 without any substantial influences regarding the beam shape in horizontal direction (perpendicular to the first and the propagation direction).

Thus, one-dimensional (vertical) focussing is achieved using cylindrical optics. The broad area laser output can first be collimated by an aspherical (circularly symmetric, non-cylindrical) lens aligned and mounted permanently together with the broad area laser source. It is also possible to skip the collimator and use a stronger vertical focussing lens. Due to the strong divergence of the source, it may however more practical to first collimate the light so that further components can be positioned with more space.

In another embodiment of the present invention, the cylindrical lens 33 is omitted. Instead, the vertical focus is obtained by shifting the laser collimation lens forward. This also focuses the beam in the horizontal direction, but this effect can be neglected in comparison with the following horizontal diffusers.

The beam forming assembly 32 further comprises two cylindrical lenslet arrays 34,35 which substantially do not influence beam forming in vertical direction but which are positioned and aligned so that a beam forming in horizontal direction is enabled. Such beam forming in the second direction is shown with FIG. 3*b*.

FIG. 3*b* shows the light emitting unit 10' in a top view, wherein beam formation regarding the second (horizontal) direction is illustrated. As mentioned, the influence on the emitted laser light 4 by the cylindrical lens 33 with respect to the second direction can be neglected. However, the micro-lens arrays 34 and 35 affect the laser beam so that an extension of propagation (angle) in a horizontal plane is caused. The cylinder lens arrays do nearly not affect the quality of the vertical focusing. In other words, the laser beam is horizontally (in sense of the second direction or so called slow axis of the laser diode) diffused by interaction with the lenslet arrays 34,35.

Moreover, the micro-lens arrays 34,35 are designed so that a desired intensity distribution of the laser light across the produced laser line is provided. A micro-lens to micro-lens pitch, a height of the respective micro-lenses and respective radii of curvatures are chosen accordingly. The light intensity is lowest in the centre of the laser line and highest at its both ends (at least 10% higher). Such excessive intensities at the great diffusion angles (around the ends of the laser line) provide a pre-compensation of expected intensity influences (losses) in particular due influencing factors related to the $\cos^4$-law. This means that intensity decays towards the ends of the laser line on side of a respective receiving unit still occur, but the amount of decay basically corresponds to the amount of the initially provided superelevation in a way that a resulting intensity at the sensor comprises an intensity of basically one level.

Figures 4A, 4B:
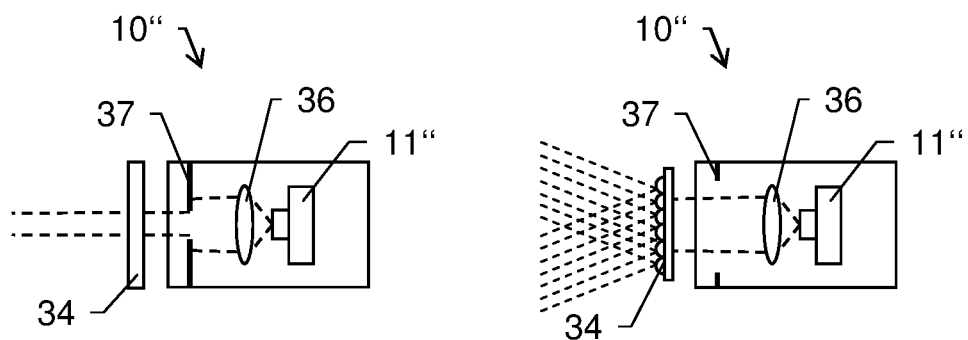
FIGS. 4a-b show another embodiment of a light emitting unit according to the invention.

FIGS. 4*a* and 4*b* show a further embodiment of a light emitting unit 10" respectively the light source 11" according to the invention from different perspectives. The optical elements 36 and 37 as shown may be directly and fixed arranged with the light source 11", wherein the light source may be understood as a laser source already being equipped with such components. FIG. 4*a* shows the laser source and a lens array 34 in side view. The light emitting unit 10" comprises a laser diode 11" and a (collimation) lens 36. In addition, the light emitting unit 10" comprises an aperture 37 of asymmetric shape. As can be seen in side view, the element 37 comprises comparatively small aperture, e.g. a quite narrow slit for light transmission, for providing large depth of focussing in the first (vertical) direction. Such collimation element 37 further provides a large aperture in the second direction reduce losses for diffusion in the horizontal plane (FIG. 4*b*). As collimation and spatial limitation of the laser beam with respect to the vertical direction can so be provided in sufficient manner, no further cylindrical lens for focusing is needed.

The focussing of the laser light in the vertical direction and diffusing in the horizontal direction leads to reduction of subjective speckles formation while providing a well defined line which is very suitable for triangulation measurements. Apart from lowering speckle noise and thus improving depth accuracy, the low-speckle illuminator also allows a much increased camera depth of field. The reason for this is that the speckle contrast no longer depends on the camera NA as it does with a fully coherent source.

In addition, relating to detection of the produced laser beam, specific camera optics may be provided with the image sensor. The camera optics may comprise a camera lens which may also have asymmetric aperture since optical resolution along line (horizontally) may be more critical than across. This also results in realising reduced exposure time and thus improves eye safety. Such camera lens may be anamorphic (different magnifications regarding the first and the second direction) to e.g. obtain a wider field of view. Preferably, the camera comprises an intensity filter to provided proper filtering of incoming light.

Due to the design of the lens array 34—and in particular of the laser source 11", the lens 36 and the aperture 37—intensity distribution of a line emittable with such arrangement is adjusted having significantly greater (at least 10% higher) intensities at its ends than in the centre of the line. In particular, intensity increase along the line is proportional to a factor $$\frac{1}{\cos^n(\alpha)},$$

wherein n is a positive integer and n is smaller or equal to 5, in particular proportional to a factor $$\frac{1}{\cos^3(\alpha)}, \frac{1}{\cos^4(\alpha)} \text{ or } \frac{1}{\cos^5(\alpha)}.$$

Figure 5:
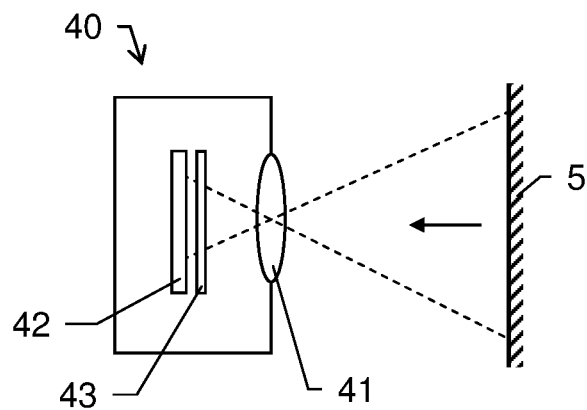
FIG. 5 shows an embodiment of a light receiving unit according to the invention.

FIG. 5 shows an embodiment of a light receiving unit 40 (e.g. camera) according to the invention. The light receiving unit 40 comprises an objective lens 41 defining a field of view of the camera and a sensor unit 42 for detecting impinging light which is reflected from an object 5. The sensor may be built as CMOS or CCD sensor providing a defined amount and configuration (arrangement, e.g. area sensor) of sensor pixels. In addition, the unit 40 comprises a filter element 43 which is arranged in front of the sensor 42 for filtering incoming light regarding its intensity distribution.

The filter element 43 is designed to provide an maximum attenuation of light intensity in its centre which corresponds to the optical axis of the lens 41 and in particular with the centre of the sensor 42. Attenuation in regions near the border of the sensor unit 42, i.e. near the edges of the light projected through the lens 41 onto the sensor 42, is set to a minimum.

The course (behave) of attenuation across the area of the filtering element 43 is defined according to an anti $\cos^4$-filter, i.e. attenuation maximum is in the central point of the filter and decreases towards the edges according to a nominator (factor) proportional to $\cos^4(\alpha)$. By providing a light receiving unit 40 like that, losses of intensity caused by an optical system of the light receiving unit 40 can be compensated so that measuring light reaches the sensor 42 with substantially uniform light intensity across a light impinging area.

According to another embodiment of the invention, the respective filter element is designed like an anti $\cos^3$- or anti $\cos^5$-filter and thus additionally is designed for compensation of fewer or further influences on the reflected measuring light, especially considering a further cosine-factor introduced by a cylindrical lens array on side of the light emitting unit.

Figure 6:
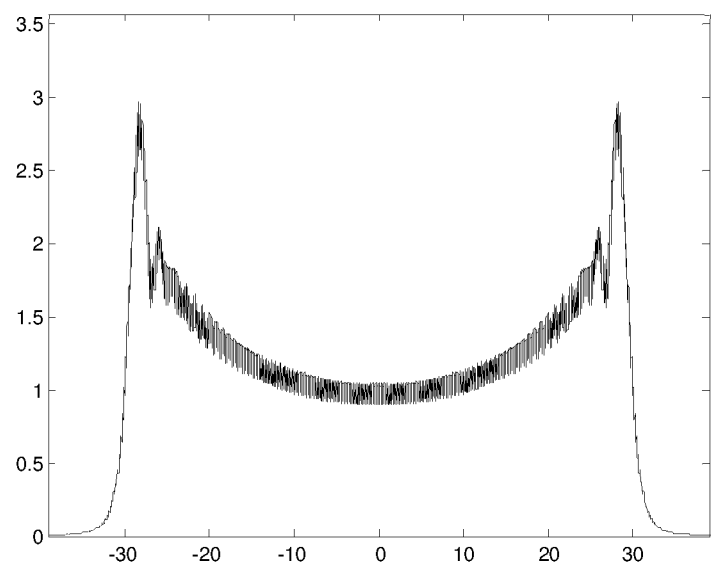
FIG. 6 shows an intensity distribution across a provided laser line according to the invention.

FIG. 6 shows an intensity distribution across a laser line according to the invention. The intensity spectrum shown here comprises excessive intensity (vertical axis) at large angles (horizontal axis) in order to compensate at least the effects caused by the $\cos^4$-law at imaging and particularly the effects provided by the cos-law concerning projection of the line (mentioned above).

In correspondence with that spectrum, a total diffusion with a respective diffusion angle of ±27° is provided, wherein the diffusion is generated using at least one microlens array and a cylindrical lens (as described).

In particular, the course of the intensity spectrum depends on a factor proportional to $$\frac{1}{\cos^4(\alpha)} \text{ or } \frac{1}{\cos^5(\alpha)}.$$

Figure 7:
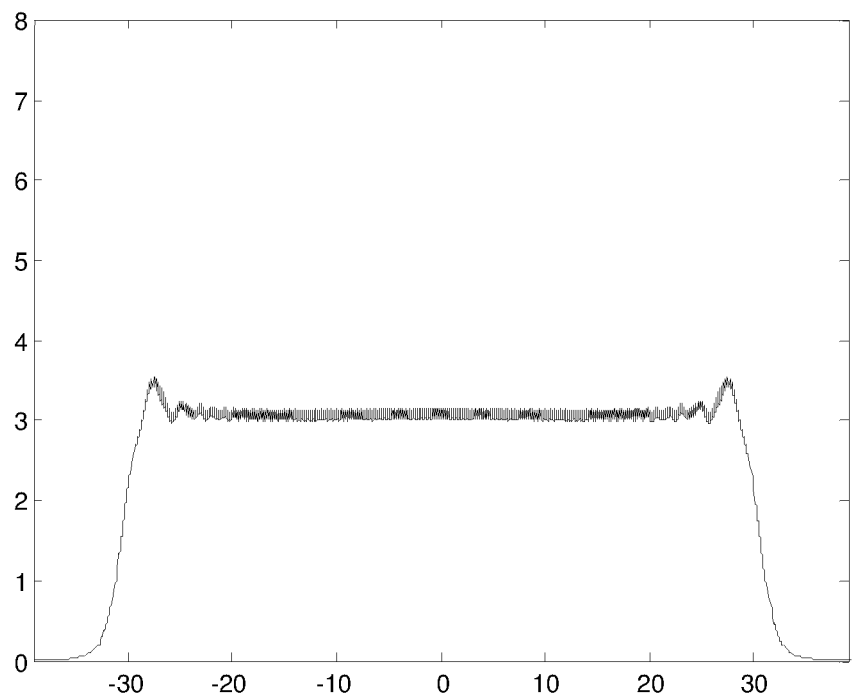
FIG. 7 shows a spectrum of intensity distribution across a laser line detected on a sensor according to the invention.

FIG. 7 shows a spectrum regarding an intensity distribution across a laser line on a sensor adapted to detect measuring laser light reflected from the object to be measured. Such distribution can be achieved by using a laser line having a spectrum according to FIG. 6 as measuring light. After projection of the provided line on the object, reflection at the object and receiving reflected light by means of optical elements on side of the detecting unit the spectrum on the camera chip (sensor) preferably shows a distribution according to the shown curve of FIG. 7, i.e. the intensity distribution across the laser line is basically uniform (proving a substantially uniform level of intensity).

The intensity distribution (relative intensity) on the camera chip is shown for a respective angle of −27° to +27°.

Figure 8:
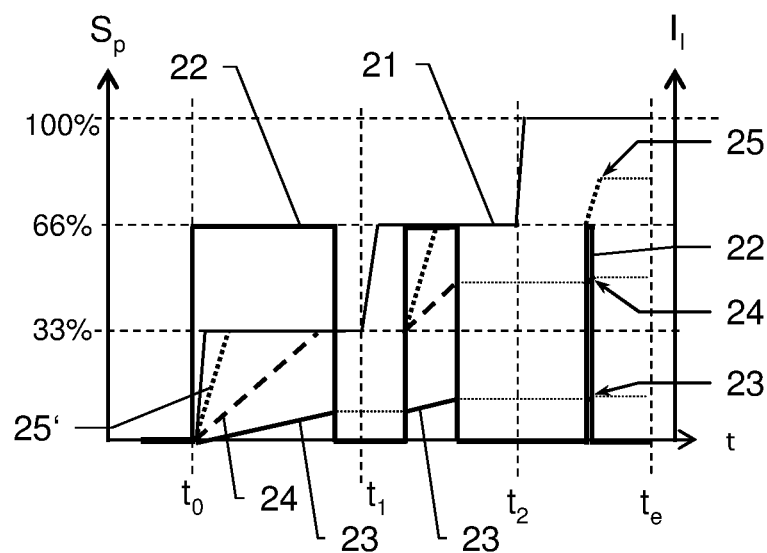
FIG. 8 shows a preferred method of illuminating and correspondingly detecting light reflected from the object according to the invention.

FIG. 8 shows a preferred method of illuminating an object to be measured and correspondingly detecting light reflected from the object according to the invention.

The image sensor used for that approach is preferably designed as a high (wide) dynamic range image sensor (HDR-sensor) having a defined number and constellation of detection pixels. Preferably, the sensor is built as an area image sensor (2D pixel grid).

The controlling of the image sensor, i.e. the duration and timing of three exposure sub-sequences ($t_0$-$t_1$, $t_1$-$t_2$ and $t_2$-$t_e$) and respectively defined saturation limits (33%, 66% and 100%), is represented by the curve 21.

As can be seen, the saturation limit $S_p$ for the pixels of the sensor is initially set to 33% of the maximum saturation of the sensor-pixels for an initial exposure period from $t_0$ to $t_1$. That initial exposure period corresponds to a first exposure sub-sequence.

At $t_1$ the saturation level of the sensor-pixels is switched to a higher state, here to 66% of the maximum saturation, and hold for a second time period $t_1$ to $t_2$. Furthermore, at $t_2$ a third saturation level is applied which corresponds to the maximum allowed saturation of the pixels. The whole detection sequence ends at time $t_e$, wherein a detection signal is provided which represents the illumination of the entire illuminated pixels.

Such exposure properties may directly be provided by an integrated controlling process of the sensor or may be defined by external controlling by an additional controlling unit. Of course, it is to be understood that mentioned settings for the exposure sub-sequences are variably definable, wherein at least two sub-sequences are defined according to the invention.

The exposure periods are defined to be of substantially equal duration, wherein the time periods are preferably set to be of shortest possible (given by respective sensor properties) duration. Both mentioned limitations are valid as long as this duration is longer than the required laser pulse duration. Or, speaking the other way round, if the sensor provides setting even shorter exposure periods, the duration of each exposure period can be set as short as the duration of a corresponding pulse is. By such an adaptation a significantly shorter overall exposure time $t_0$ to $t_e$ is provided (e.g. of about 100 µs) compared to typical exposure setting (approximately more than 10 ms). As a result, even faster acquisition of distance information with a greater frequency (resolution in time) can be provided which leads to more precise representations of a measured surface. Moreover, the generation of motion blur can be significantly reduced or avoided this way.

In correspondence of setting the exposure sub-sequences like that (of (basically equal) shortest durations) the illumination of the object to be measured is adapted adequately in order of produce measuring data providing reliable and precise pixel information. The way of illumination, i.e. of emitting the measuring light, is shown with curve 22 (course of the illumination intensity II). In particular, the exposure sequences are set to be comparatively short, wherein respective amounts of light emitted and received are significantly higher compared to those of prior art.

Thus, the measuring light here is no longer emitted in constant manner but is emitted as a pulsed measuring light, preferably as pulsed laser light. The pulses are adjusted so that one pulse is emitted for each exposure sub-sequence. The pulse energies decrease from exposure period to exposure period. For instance the pulse power can be kept basically constant at e.g. the maximum power of the laser diode while decreasing the pulse duration. Alternatively, the pulse durations may be kept constant while reducing the pulse powers. Of course, a combination of both approaches may be applied instead. Such light emitting in combination with the detection sub-sequences provides for charging of slightly and intensely illuminated pixels so that no maximum saturation of respective pixels is reached and suitable pixel information can be derived for each of the pixels.

Therefore, the controlling of pixel's illumination is mainly provided by applying and adjusting the light pulses and keeping the durations of the exposure sub-sequences constant, i.e. of basically equal durations.

The three lines 23, 24 (dashed) and 25 (dotted) represent the charging of three example depicted pixels of the sensor due to the illumination with pulsed measuring light. Curve 23 representing a pixel being of quite low illumination shows a charging of the respective pixel during the illumination in the first period $t_0$ to $t_2$ until the illumination intensity is reduced to zero (i.e. the end of the laser pulse). During illumination by the second pulse (within the second period $t_1$ to $t_2$) the pixel continues charging, starting from the level of the end of the first light pulse (as there is no further charging of the pixel during the period of no illumination, i.e. zero intensity). Furthermore, the charge increases also by emitting the third (shortest) laser pulse so that the final detection signal for that pixel is produced without having a respective saturation.

The same applies for the pixels represented by curves 24 and 25, wherein for those pixel further partial resets or limitations of charging states apply. This is because the pixels illuminations run into respective saturation limits (33% and 66%) set for the first and second exposure sub-sequence. The charging or illumination level for those pixels continues increasing in the successive exposure sub-sequence starting from the preceding saturation limit. Such increase depends on the duration of the respective illumination (pulse duration) and the individual amount of measuring light impinging on the respective pixel per time step (i.e. slopes of the lines 23, 24 and 25).

Such procedure provides a detection of bright pixels (compare pixel represented by curve 25) and dark pixels (curve 23) with one common detection sequence so that none of the pixels runs into a maximum level of saturation (100%) and suitable and detectable pixel brightness is provided at the end to of the detection sequence.

According to an alternative embodiment, for adjusting the illumination amount of light for each exposure sub-sequence, not only the pulse duration but also the pulse power may particularly individually be adjusted.

Of course, it is to be understood in sense of the present invention that the number of exposure sub-sequences is not limited to three but the invention also relates to detection sequences with at least two exposure sub-sequences, i.e. two or more such sub-sequences. Correspondingly, the definition of the individual saturation limits (33%, 66%) may also vary due to a desired application, the number of sub-sequences and/or the provided light source.

Figure 9:
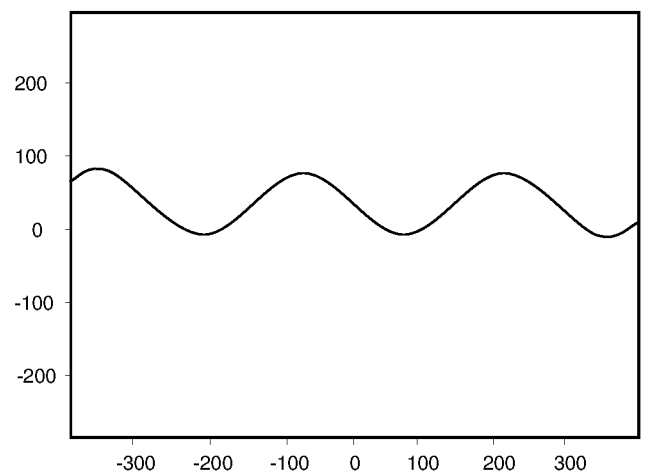
FIG. 9 shows a surface measurement of an embodiment of a micro-lens array which can be used for providing a light line with respective intensity distribution along the line.

FIG. 9 shows a surface measurement of an embodiment of a micro-lens array which can be used for providing a light line with respective intensity distribution along the line as described above. The design of such micro-lens array is sinusoidal meaning a periodic pattern of convex and concave acylindrical lenses. The chart shows a measured height in micrometers over respective lateral positions the measurements are taken (in micrometers as well). As can be seen, according to the shown embodiment the height between the lowest points and the highest points in the profile is in a range of 70 to 90 μm.

Of course, according to alternative embodiments of the micro-lens array (not shown) there might be different heights and/or distances from lens to lens. E.g. the lenses may be provided with alternating radius sign between 7 μm and 18 μm, i.e. with heights of about 15 μm to 36 μm.

Although the invention is illustrated above, partly with reference to some specific embodiments, it must be understood that numerous modifications and combinations of different features of the embodiments can be made and that the different features can be combined with each other or with triangulation principles and/or coordinate measuring machines known from prior art.

What is claimed is:

1. A method of providing measuring light, for triangulation-based distance measurement to an object to be measured, wherein distance information is derivable by detecting at least portions of the measuring light reflected at the object, the method comprising:
emitting light, and
shaping the light so that the measuring light is provided in form of a line having a midpoint and two opposite ends, wherein:
adjusting the intensity distribution of the light across the line so that a respective light intensity at the ends of the line is at least 10% greater than light intensity around the midpoint, and
shaping the light is provided by means of a first micro-lens array and a fast axis aperture stop.

2. The method according to claim 1, wherein:
the intensity distribution of the light across the line is adjusted so that light intensity from the midpoint to the respective ends of the line increases:
according to an expected decay of intensity along the line due to an interaction with an optical element, in particular so that the expected decay is compensated and a signal amplitude on side of an detector provideable for receiving the line is basically constant along the received line, and/or
according to a factor proportional to $$\frac{1}{\cos^n(\alpha)},$$

wherein n is a positive integer and n<5, in particular proportional to $$\frac{1}{\cos^3(\alpha)}, \frac{1}{\cos^4(\alpha)} \text{ or } \frac{1}{\cos^5(\alpha)}.$$

3. The method according to claim 1, wherein:
the intensity distribution of the light across the line is defined by defined diffusion of the emitted light with a particular diffusion angle α, wherein the midpoint defines a diffusion angle of α=0° and maximum diffusion angle values correspond to the respective ends of the line.

4. The method according to claim 3, wherein: the light intensity increases with increasing diffusion angle values according to a factor proportional to $$\frac{1}{\cos^n(\alpha)},$$

wherein n is a positive integer and n<5, in particular proportional to $$\frac{1}{\cos^3(\alpha)}, \frac{1}{\cos^4(\alpha)} \text{ or } \frac{1}{\cos^5(\alpha)}.$$

5. A method for determining distances to an object to be measured based on the principle of triangulation, comprising:
emitting light,
shaping the light so that measuring light is provided in form of a line,
directing the measuring light to the object to be measured,
receiving measuring light reflected at the object to be measured,
directing the received measuring light to a sensor, detecting the received measuring light by means of the sensor, and deriving distance information based on the detected reflection, wherein:

the measuring light is generated and emitted in form of a line according to the method of claim 1, wherein the received measuring laser light reaches the sensor with a substantially uniform intensity distribution across the line, or the received measuring light recorded by the sensor has a substantially uniform signal amplitude across the line.

6. A light emitting unit, in particular of or for a triangulation-based distance measuring device, for providing defined measuring light, in particular laser light, the light emitting unit comprising:

a light source for emitting light, in particular a laser light source for emitting laser light, and a beam forming assembly for shaping the light by affecting propagation of the light emitted by the light source, wherein the beam forming assembly is arranged and designed so that measuring light is provided in form of a light line having a midpoint and two opposite ends, wherein:

the light source and the beam forming assembly are arranged and designed so that an intensity distribution of the light across the line is adjustable such that a respective light intensity at the ends of the line is at least 10% greater than light intensity around the midpoint, and the beam forming assembly comprises a first micro-lens array and a fast axis aperture stop.

7. The light emitting unit according to claim 6, wherein:
the beam forming assembly is arranged and designed so that the intensity distribution of the light across the line is provided so that light intensity increases from the midpoint to the respective ends of the line:

according to an expected decay of intensity along the line due to an interaction with an optical element, in particular so that the expected decay is compensated and a signal amplitude on side of an detector provideable for receiving the line is basically constant along the received line, and/or according to a factor proportional to $$\frac{1}{\cos^n(\alpha)},$$

wherein n is a positive integer and n<5, in particular proportional to $$\frac{1}{\cos^3(\alpha)}, \frac{1}{\cos^4(\alpha)} \text{ or } \frac{1}{\cos^5(\alpha)}.$$

8. The light emitting unit according to claim 6, wherein:
the beam forming assembly is arranged and designed so that the measuring light emitted by the light source is diffused by a particular diffusion angle $\alpha$, wherein the midpoint defines a diffusion angle of substantially $\alpha=0°$ and maximum diffusion angle absolute values correspond to the respective ends of the line, and the diffusion angle $\alpha$ is of a range of ±25° to ±30°, wherein an overall included angle of diffusion corresponds to 50° to 60°.

9. The light emitting unit according to claim 6, wherein:
the beam forming assembly is arranged and designed so that the measuring light emitted by the light source is diffused by a particular diffusion angle , wherein the midpoint defines a diffusion angle of substantially and maximum diffusion angle absolute values correspond to the respective ends of the line, and the light intensity increases with increasing diffusion angle values according to a factor proportional to $$\frac{1}{\cos^n(\alpha)},$$

wherein n is a positive integer and n<5, in particular proportional to $$\frac{1}{\cos^3(\alpha)}, \frac{1}{\cos^4(\alpha)} \text{ or } \frac{1}{\cos^5(\alpha)}.$$

10. The light emitting unit according to claim 6, wherein the beam forming assembly comprises:

a cylindrical lens, and a second micro-lens array, in particular cylindrical lens array, wherein:

the first micro-lens array is arranged to receive the measuring light emitted by the light source and the cylindrical lens is arranged in-between the first and the second micro-lens array, wherein the beam forming assembly additionally comprises:

a collimator, and/or a baffle.

11. The light emitting unit according to claim 6, wherein:
at least one of the first and second micro-lens array is designed having a micro-lens to micro-lens pitch in a range of 20 μm to 200 μm, in particular having a pitch of 150 μm.

12. The light emitting unit according to claim 6, wherein:
a topographic lens height regarding a surface of the micro-lens array of at least 5 μm, in particular between 40 μm and 50 μm.

13. The light emitting unit according to claim 6, wherein:
a periodic surface structure, in particular sinusoidal, wherein the micro-lens array is represented by a pattern of convex and concave acylindrical lenses.

14. A triangulation-based distance measuring device comprising:

a light emitting unit with a light source for providing measuring light in form of a light line with defined intensity distribution across the line, wherein the light emitting unit is designed according to claim 6, a light receiving unit having a sensor for detecting measuring light reflected and received from an object to be measured and a controlling and processing unit for deriving distance information based on the detected reflection, wherein:

the light emitting unit and the light detection unit are arranged with known spatial position and orientation relative to each other, in particular according to the Scheimpflug criterion, and the light emitting unit and the light detection unit are designed so and arranged relative to each other so that measuring light received by the light receiving unit reaches the sensor with a substantially uniform intensity distribution across the line, or measuring light recorded by the sensor has a substantially uniform signal amplitude across the line.

15. The distance measuring device according to claim 14, wherein:

the light receiving unit comprises a filter element adapted to filter the intensity distribution of receiving measuring light based on the known intensity distribution of the measuring light provideable by the light emitting unit so that the measuring light reaches the sensor with a substantially uniform intensity distribution across the line or is recorded by the sensor with a substantially uniform signal amplitude across the line.

16. The distance measuring device according to claim 14, wherein:

the filter element is designed as an anti-$\cos^n$-filter, wherein n is a positive integer<5, in particular as an anti-$\cos^3$-filter, anti-$\cos^4$-filter or an anti-$\cos^5$-filter.

* * * * *